(12) United States Patent
Bönig et al.

(10) Patent No.: US 12,705,725 B2
(45) Date of Patent: Aug. 11, 2026

(54) SYSTEMS AND METHODS FOR PREDICTING A QUALITY OF A PRINTED CIRCUIT BOARD ASSEMBLY

(71) Applicants: Jochen Bönig, Nuremberg (DE); Konstantin Schmidt, Nuremberg (DE); Sven Meier, Arzberg (DE)

(72) Inventors: Jochen Bönig, Nuremberg (DE); Konstantin Schmidt, Nuremberg (DE); Sven Meier, Arzberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 277 days.

(21) Appl. No.: 17/889,337

(22) Filed: Aug. 16, 2022

(65) Prior Publication Data

US 2023/0053878 A1 Feb. 23, 2023

(30) Foreign Application Priority Data

Aug. 17, 2021 (EP) .................................... 21191727

(51) Int. Cl.
*G01N 23/18* (2018.01)
*G06T 7/00* (2017.01)

(52) U.S. Cl.
CPC .... *G06T 7/001* (2013.01); *G06T 2207/10116* (2013.01); *G06T 2207/20081* (2013.01);
(Continued)

(58) Field of Classification Search
CPC ......... G06T 2207/10116–10128; G06T 7/001; G06T 2207/20081; G06T 2207/30141;
(Continued)

(56) References Cited

U.S. PATENT DOCUMENTS 5,963,662 A * 10/1999 Vachtsevanos ....... G06T 7/0006 374/10
2013/0279795 A1* 10/2013 Shlain .................. G06V 10/987 382/149

(Continued)

FOREIGN PATENT DOCUMENTS

CN 110880175 A 3/2020
CN 111598090 A 8/2020

(Continued)

OTHER PUBLICATIONS

J. Nau, J. Richter, D. Streitferdt and M. Kirchhoff, "Simulating the Printed Circuit Board Assembly Process for Image Generation," 2020 IEEE 44th Annual Computers, Software, and Applications Conference (COMPSAC), Madrid, Spain, 2020, pp. 245-254, doi: 10.1109/COMPSAC48688.2020.00040. (Year: 2020).*

(Continued)

*Primary Examiner* — Stephen R Koziol
*Assistant Examiner* — Dylan J Sherrillo
(74) *Attorney, Agent, or Firm* — Lempia Summerfield Katz LLC

(57) ABSTRACT

A computer-implemented method of predicting a quality of a printed circuit board (PCB) assembly includes obtaining production data relating to production of the PCB assembly. The production data is mapped onto a latent vector of a latent space of a trained adaptive algorithm. The trained adaptive algorithm is trained on real X-ray images of PCB assemblies and/or serves for generating X-ray images of PCB assemblies. A subspace of the latent space related to the latent vector is determined. The subspace indicates a quality of the PCB assembly. Alternatively or additionally, an X-ray image of the PCB assembly is generated by the trained adaptive algorithm based on the latent vector in order to determine a quality of the PCB assembly.

15 Claims, 11 Drawing Sheets

(52) U.S. Cl.
CPC ............... *G06T 2207/30141* (2013.01); *G06T 2207/30152* (2013.01)

(58) Field of Classification Search
CPC . G06T 2207/30152; G06T 2207/10081; G06T 2207/20084; G06T 7/0004; G01N 23/04; G01N 23/083; G01N 23/18; G01N 2223/1016; G01N 2223/401; G01N 2223/6113; G01N 2223/646; G06N 20/00
See application file for complete search history.

(56) References Cited

U.S. PATENT DOCUMENTS

| | | | |
|---|---|---|---|
| 2020/0020098 A1 | 1/2020 | Odry et al. | |
| 2021/0010953 A1* | 1/2021 | Adler | G01T 1/20 |
| 2022/0104410 A1 | 3/2022 | Su et al. | |
| 2022/0373440 A1 | 11/2022 | Chen et al. | |

FOREIGN PATENT DOCUMENTS

| | | |
|---|---|---|
| CN | 112261866 A | 1/2021 |
| EP | 3828632 A1 | 6/2021 |
| JP | 2016191589 A | 11/2016 |
| JP | 2018128468 A | 8/2018 |
| KR | 101661687 B1 | 9/2016 |
| KR | 20220102626 A | 7/2022 |

OTHER PUBLICATIONS

Y.-J. Ni, Y.-T. Wang and T.-Y. Ho, "Footprint Classification of Electric Components on Printed Circuit Boards," 2020 ACM/IEEE 2nd Workshop on Machine Learning for CAD (MLCAD), Reykjavik, Iceland, 2020, pp. 169-174, doi: 10.1145/3380446.3430637. (Year: 2020).*

Villaraga-Gómez, Herminso, and Joshua D. Bell. "Modern 2D & 3D X-ray technologies for testing and failure analysis." ISTFA 2019. ASM International, 2019.

Goto, Keisuke, et al. "Anomaly detection of solder joint on print circuit board by using adversarial autoencoder." Fourteenth International Conference on quality control by artificial vision. vol. 11172. Spie, 2019. pp. 1-6.

* cited by examiner

10
D
11
102, 104
12
100
101
11b
11a
1
101
13

Input-Image
20
Encoder
104b
C
encoded
array([[ 0.031034 , -0.23332128],
[ -1.9868743 , -0.8541963 ],
[ 2.5214062 , -0.84850353],
...
[ 0.39253458 , -0.15627943],
[ -0.8981159 , -0.07952186],
[ -0.6018747 , 0.61838466]],
dtype=float32)
AE
Decoder
104a
Output-Image
105

SYSTEMS AND METHODS FOR PREDICTING A QUALITY OF A PRINTED CIRCUIT BOARD ASSEMBLY

This application claims the benefit of European Patent Application No. EP 21191727.3, filed on Aug. 17, 2021, which is hereby incorporated by reference in its entirety.

TECHNICAL FIELD

The present disclosure is concerned with electronics production and, more specifically, production of printed circuit board assemblies and the inspection of the same.

BACKGROUND

Electronics production is prone to a multitude of possible failures along the production process. Therefore, the manufacturing process of surface-mounted electronics devices (SMD) includes quality inspection processes for defect detection. The detection of certain error patterns like solder voids and head-in-pillow defects require radioscopic inspection. These high-end inspection machines, such as the X-ray inspection, rely on static checking routines, programmed manually by the expert user of the machine, to verify the quality. The utilization of the implicit knowledge of domain expert(s), based on soldering guidelines, allows the evaluation of the quality. The distinctive dependence on the individual qualification significantly influences false call rates of the in-built computer vision routines.

According to the prior art, the quality assessment of a solder joint is carried out by the utilization of X-ray inspection based on grayscale images. The intensity of certain areas of the x-ray image varies depending on the material being irradiated. This results in darkened image areas for metallic material accumulations. Automated evaluation of predefined image areas is carried out based on these differences in intensity. If a certain number of pixels within this area exceeds a set threshold, the area is marked as insufficient. A confirmation from the operator is to be carried out. These product-specific test routines are manually created and adjusted. The current analysis methods utilized in commercially available machines are based on deterministic, rule-based systems. In industrial applications, a distinction is made between different X-ray technologies. Vertical radiography of components is referred to as 2D X-ray. X-ray is a cost-efficient solution for unshaded components with relatively short relatively short process times. Due to radiation as it passes through matter, a gray scale image (0-255) may be generated by a sensor (e.g., digital sensor) depending on the material and volume penetrated by the radiation. By an integrated image recognition or manual visual inspection, deviations within the gray value distribution may be identified.

Due to higher packing density or double-sided assembly, more complex systems are used to provide sufficient imaging. The unfavorable aspect ratio of PCBs requires separate 3D processes. To a certain extent, shadowing effects may be reduced by moving the component between the X-ray source and detector and reconstructing a quasi-3D image via slice images, referred to as 2.5D inspection. For further reduction of shadowing, in laminography, the X-ray unit and detector are moved at an angle around the component on coplanar trajectories, with the axis of rotation oblique to the beam direction. Through multiple image acquisitions and reconstruction algorithms (e.g., Tomosynthesis), a 3D image is formed. Due to the specific setup and the small distances between the system and the component, high magnifications are possible.

SUMMARY AND DESCRIPTION

The scope of the present invention is defined solely by the appended claims and is not affected to any degree by the statements within this summary.

The present embodiments may obviate one or more of the drawbacks or limitations in the related art. For example, inspection of PCB assemblies may be improved, and the number of inspection acts may be reduced. Accordingly, as another example, the effort in the manufacture of a product may be reduced.

During the production, a quality control or inspection may be carried out after the manufacture of the product and/or after individual production acts. The quality control is carried out by an imaging process, whereby it is determined on the basis of an image whether the manufactured product meets the quality requirements. Especially for products where imaging of the outside of the product is not sufficient, images may be created with the help of X-rays.

Quality control is often time-consuming and sometimes requires high safety standards. For example, the use of X-rays is disadvantageous in quality control. In addition, quality control is a significant cost factor.

According to a first aspect, a computer-implemented method of predicting a quality of a printed circuit board is provided. The method includes the obtaining production data relating to the production of the PCB assembly. The method further includes mapping (e.g., based on a trained regression algorithm) the production data onto a latent vector of a latent space of a trained adaptive algorithm. The trained adaptive algorithm is trained on real X-ray images of PCB assemblies and/or serves for generating X-ray images of PCB assemblies. The method further includes determining a subspace of the latent space related to the latent vector. The subspace indicates a quality of the PCB assembly (e.g., of a region of interest of the PCB assembly). Alternatively or additionally, the method further includes generating, by the trained adaptive algorithm, based on the latent vector, an X-ray image of the PCB assembly (e.g., of the region of interest) in order to determine a quality of the PCB assembly.

According to a second aspect, an apparatus (e.g., an inspection station) including a processor and a memory, operative to perform the method acts according to the first aspect, is provided.

According to a third aspect, a computer-implemented method of obtaining an adaptive algorithm for predicting a quality of one or more PCB assemblies is provided. The method includes obtaining real X-ray images of one or more PCB assemblies (e.g., from an X-ray inspection system). The method further includes training an autoencoder capable of reconstructing the real X-ray images input. The method further includes obtaining the adaptive algorithm for predicting the quality of one or more PCB assemblies by identifying a decoder part of the autoencoder (e.g., by removing an encoder part of the autoencoder). The decoder part serves as a latent space interpreter.

According to a fourth aspect, a computer-implemented method of obtaining a regression algorithm for predicting the quality of one or more PCB assemblies is provided. The method includes obtaining production data and latent vectors of a latent space from a trained encoder. The trained encoder serves for compressing X-ray images. The method further includes training the regression algorithm (e.g., an X-Tree Boost Algorithm) capable of mapping the production data onto the latent vectors, thereby obtaining the trained regression algorithm.

These and other objects, features, and advantages of the present disclosure will become apparent upon reading the following Detailed Description in view of the Drawings briefly described below.

BRIEF DESCRIPTION OF THE DRAWINGS

FIG. 20 illustrates one embodiment of an apparatus including a processor and a memory.

DETAILED DESCRIPTION

Figure 1:
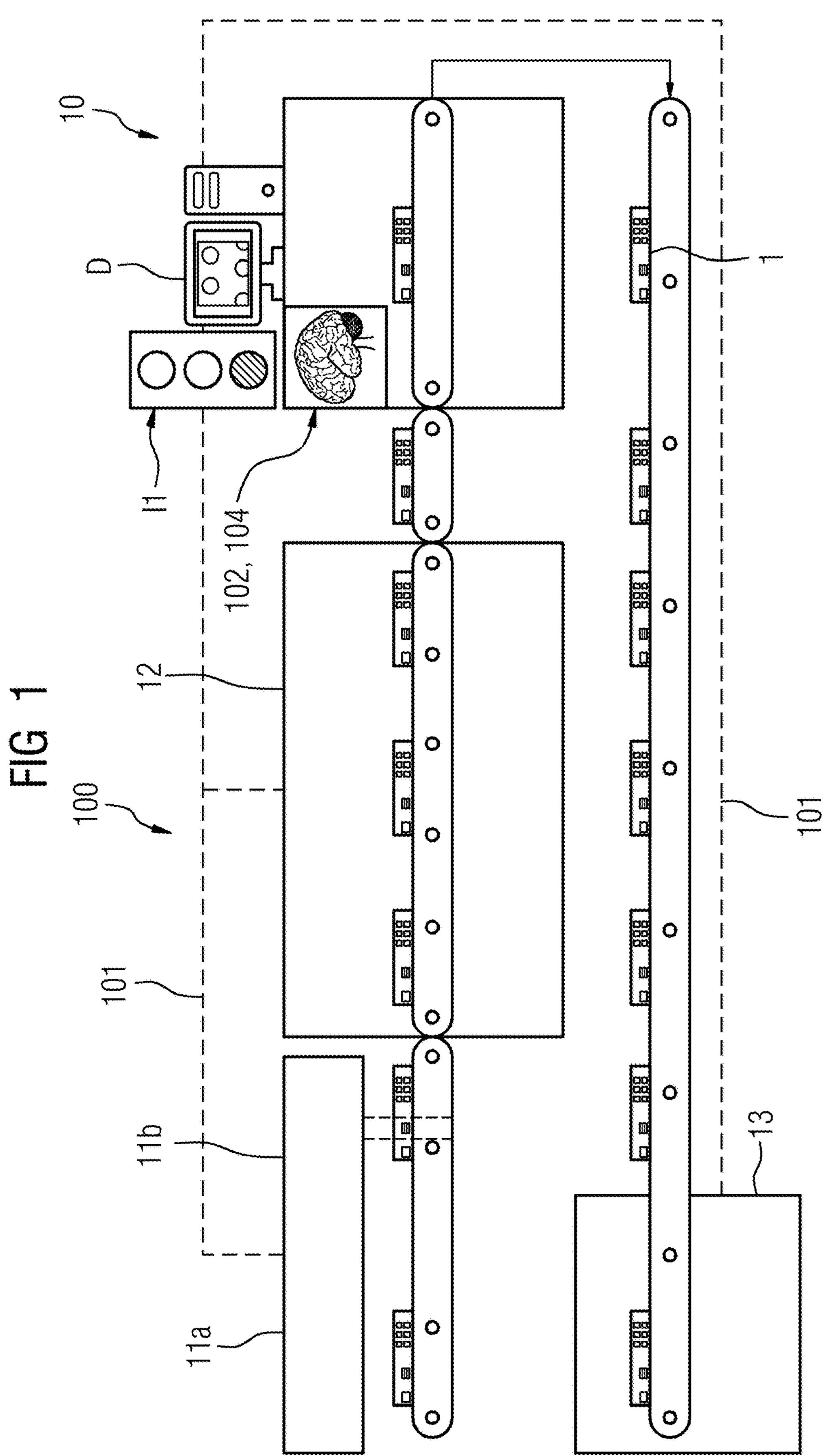
FIG. 1 shows an illustration of a production site for producing and inspecting printed circuit board assemblies.
Figure 8:
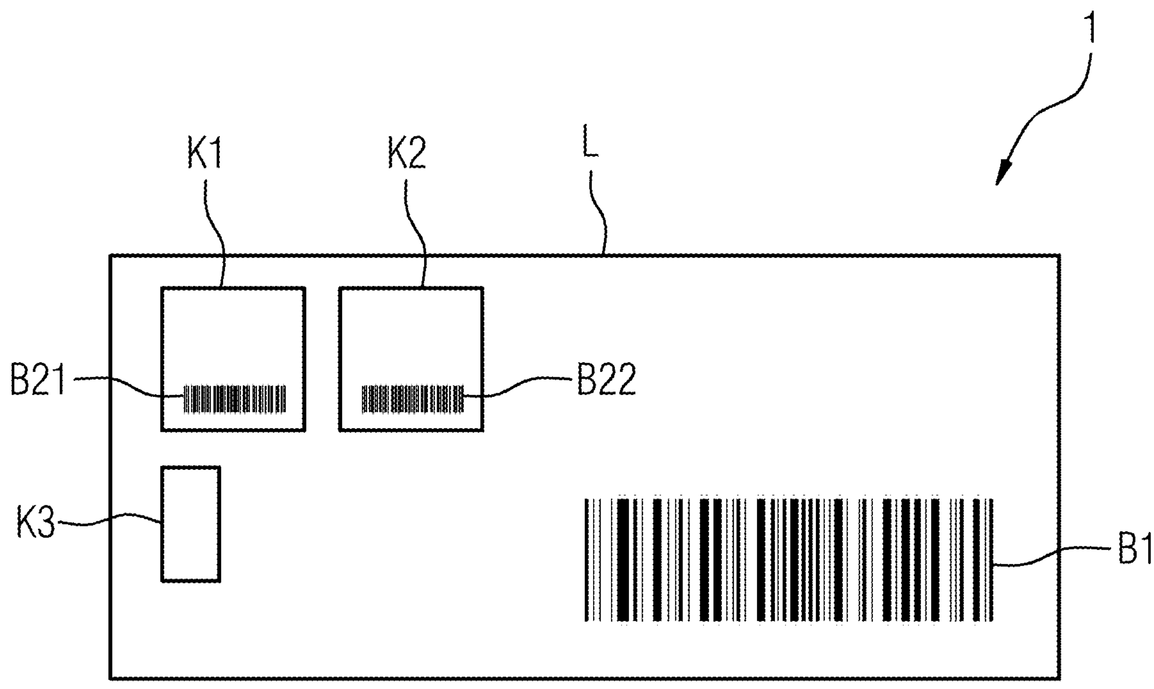
FIG. 8 illustrates one embodiment of a PCB assembly including a plurality of components mounted on a PCB.

In electronics production, electrical components are electrically and mechanically connected to a printed circuit board (e.g., using through-hole technology (THT)), as shown in FIG. 1 and in FIG. 8. In most cases, the electrical components are plugged into mounting holes on the printed circuit board at a placement station 11*b*, such as a manual placement station or with the help of a placement robot. Before the placement station 11*b*, solder paste may be applied to the printed circuit board by solder paste printing. Thereafter, the solder paste applied to the printed circuit board may be inspected at a solder paste inspection station 11*a*. The printed circuit board, together with the plugged electrical components, then drives into a wave soldering machine 12, where the printed circuit board is pulled over a soldering shaft. There, tin creates an electrically conductive connection between the circuit board and the electrical components. After the soldering process, the PCB assembly is obtained and the contact points (hereinafter, solder joints) and characteristics of the contact points are inspected at an inspection station 10 for quality control. For this purpose, optical inspections (AOIs) and/or X-ray inspections (AXI) may be used, as shown in FIG. 1. The inspection station 10 includes hardware components for image processing such as an X-ray source, digital sensor, computer, etc. For example, such an inspection station is proffered by Omron under the denomination VT-X750. VT-X750's design employs 'Computed Tomography' (CT), providing high-precision X-ray imaging to perform precise and reliable inspection of soldered areas during production. VT-X750 inspects soldered defects such as Head in Pillow and Voids within BGA, LGA, THT and other discrete devices. As a result, real X-ray images are obtained.

Possible defects that the inspection station 10 is supposed to detect are missing components, crooked components, solder joints with insufficient wetting (e.g., cold or open solder joints), or tin bruises (e.g., electrical contacts of solder joints that should have electrical potential).

Via the X-ray inspection, a real X-ray image is captured via image acquisition. For example, a digital X-ray detector may be used that measures the flux, spatial distribution, spectrum, and/or other properties of X-rays.

If the image processing detects one or more errors on a printed circuit board assembly, the PCB assembly is fed via a return route to a diagnostic station 13 for manual inspection. An operator on site performs a manual (e.g., visual) inspection (e.g., via a display D on a diagnostic dashboard).

Thus, in general, the production of a PCB assembly requires one or more (e.g., a plurality of) production acts. The quality of the PCB assembly is determined by these production acts and is only checked (e.g., not influenced or modified) by the X-ray machine. Therefore, the quality of the PCB assembly is already given before the X-ray inspection. Therefore, it is provided to make use of and to profit from the production data generated in connection with the one or more production steps of the PCB assembly.

In relation to the production of a printed circuit board assembly, production data may be obtained from the different production stations at which the one or more production acts are performed. The production data may be: the position of a solder paste on a circuit board; the deviation of the applied solder paste in relation to a target position or a target path; the thickness of the applied layer of solder paste; and/or a temperature or a humidity of the production environment. Production data 101 may be obtained by one or more sensors at each of the production stations. A sensor may be a camera, a temperature sensor, a position sensor, a distance sensor, a vibration sensor, or a flow sensor. Alternatively or additionally, production data may be obtained from a database in a memory either on-site in the inspection station, the production station, or off-site via a remote connection to a memory (e.g., in a repository from the component manufacturer). The production data 101 may be obtained from the respective production station via a data bus. The production stations may, for example, be communicatively connected to the data bus.

The production data may include or be based on one or more of the following: solder paste information, such as formation, size, and/or volume of one or more solder depots applied to the PCB (e.g., obtained from a solder paste inspection station); component information, such as coplanarity information of a component's pins (e.g., obtained from a component placement machine (11*b*) or from a component supplier); information of one or more properties of the PCB, such as, for example, a substrate material of the PCB, solder resist application process type, production site (e.g., obtained from a barcode (B) on the PCB); and/or a residual oxygen level, a temperature profile of a reflow oven (12), and/or degree of aging of the PCB and/or the components mounted on the PCB.

The inspection station 10 may be operative to determine the quality of a printed circuit board assembly 1. A quality indicator I1 may be used for this. The quality indicator may indicate whether the PCB assembly meets the quality requirements. A quality indicator may be represented by "0" or "1" (in binary representation). "0" may be, for example, that the respective PCB assembly does not meet the quality requirements, and "1" may be that the respective PCB assembly meets the quality requirements.

Figure 20:
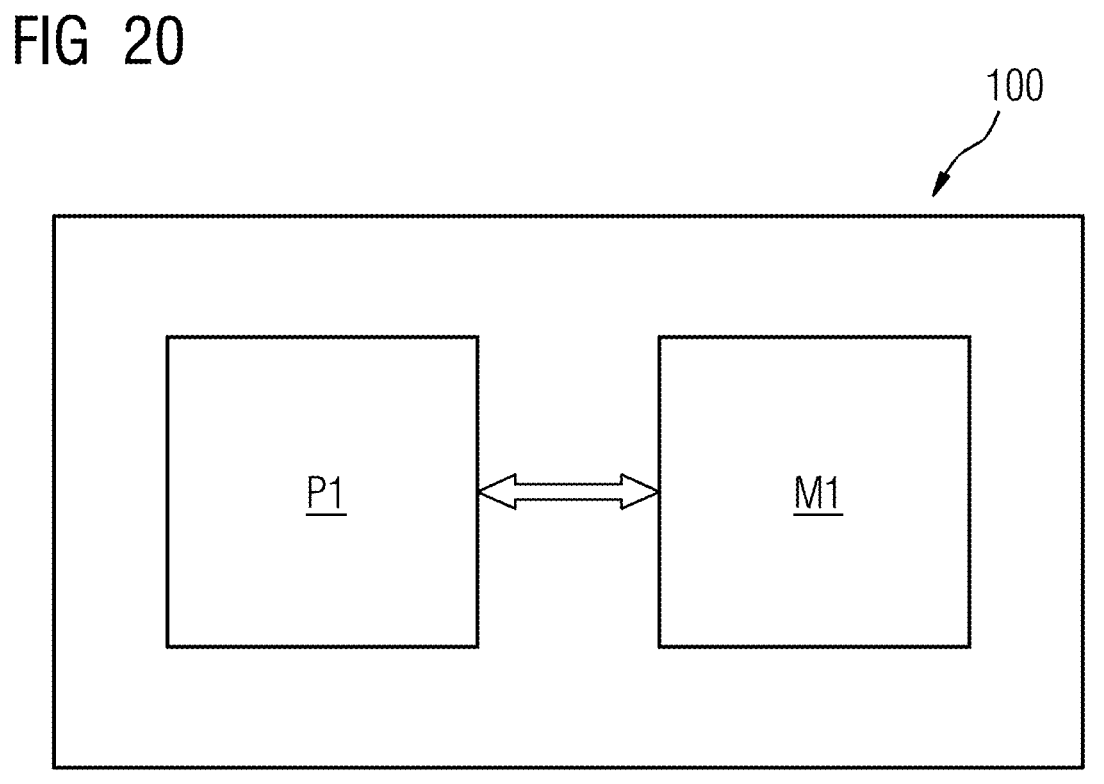

The quality indicator indicates, for example, whether all the connections between the components are adequately developed. The quality indicator may also indicate whether a PCB assembly will be functional after its production. The quality indicator may be calculated with the aid of a computer program, the computer program being installed and/or executable on a computing unit such as a processor (e.g., in the inspections station 10 or the apparatus as shown in FIG. 20). Instead of a real X-ray image, the quality indicator may be calculated based on the production data. The calculation may be carried out using a regression algorithm 102 (e.g., trained) and/or an adaptive algorithm 104 (e.g., trained), as will be described in the following. Both, the regression algorithm 102 and the adaptive algorithm 104 are machine learning models (e.g., trained).

Figure 2:
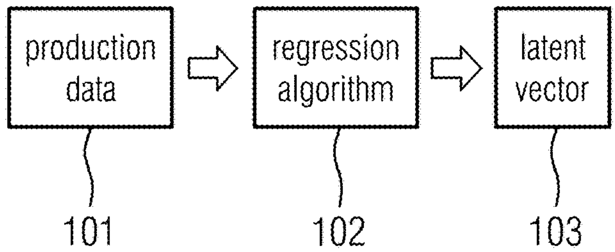
FIG. 2 illustrates a first embodiment according to which production data is mapped onto a latent vector.

FIG. 2 illustrates a first exemplary embodiment according to which production data is mapped onto a latent vector.

The production data 101 is input into a regression algorithm 102 (e.g., trained). The training of the regression algorithm 102 will be described later on herein. The regression algorithm maps the production data 101 input onto a latent vector 103. The latent vector is located in a latent space of an adaptive algorithm (e.g., trained), as will be described later on herein as well. Thus, the trained regression 102 algorithm determines a latent vector in order to predict the quality of a printed circuit board assembly. Thus, the latent vector serves for predicting the quality of the PCB assembly.

In the present case, the production data is mapped onto the latent space of a trained adaptive algorithm (e.g., the latent space of a trained autoencoder). Autoencoders (AE) are artificial neural networks that possess an encoder-decoder architecture. The encoder part maps the input into the latent space, and the decoder part maps the latent space to a reconstruction of the input. A latent vector in the latent space, as determined (e.g., by the trained regression algorithm) based on the production data, may thus be interpreted by the decoder part.

A further development of the classic autoencoder represents the architecture of the Variational Autoencoder (VAE). With this model, a regularization of the distribution of latent representation is obtained to provide that the learned latent space is continuous and thus every point in the latent space may be mapped to a meaningful data point by the decoder. The crucial difference between VAEs and other types of autoencoders is that VAEs represent the latent representation as a latent variable with their own prioritized distribution. This gives them a Bayesian interpretation. Variational autoencoders are thus generative models with prior and posterior data distributions.

Alternatively, a contractive autoencoder (CAE) (e.g., based on Resnet18) may be used to autonomously generate X-ray images from numerical production data obtained from the prior production acts. In that case, the encoder part may be based on a Resnet18 and the decoder may be based on an inverted Resnet18.

Figure 3:
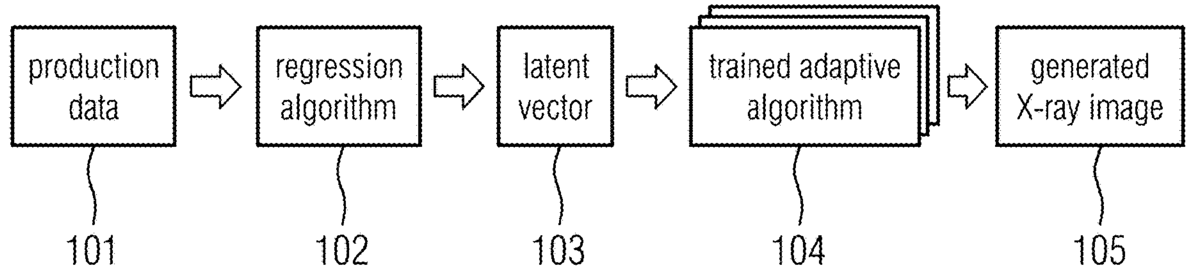
FIG. 3 illustrates a second embodiment according to which an X-ray image is generated based on production data.

FIG. 3 illustrates a second exemplary embodiment according to which an X-ray image is generated based on production data. Similarly to the embodiment of FIG. 2, the production data is input into a regression algorithm (e.g., trained). The regression algorithm maps the production data relating to the production of a PCB assembly onto a latent vector. The latent vector belongs to a latent space. The latent space is created using one or more real X-ray images. For example, an autoencoder may be trained on real X-ray images, and the latent space may be extracted from the autoencoder after training. Accordingly, a decoder part of the autoencoder, also referred to as an adaptive algorithm (e.g., trained), may be used to generate an X-ray image. Hence, based on the latent vector 102, an artificially generated X-ray image may be obtained by decoding, decompressing, or reconstructing the latent vector 103. As a result, a generated X-ray image (e.g., artificially generated) that may be used for determining the quality of the one or more PCB assemblies is obtained. The X-ray imaging process therefore is no longer necessary, as the generated X-ray image may be utilized for the inspection.

Figure 4:
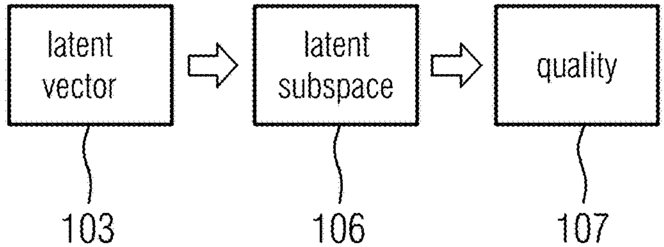
FIG. 4 illustrates a third embodiment according to which a quality of a PCB assembly is determined based on a latent vector.

FIG. 4 illustrates a third exemplary embodiment according to which a quality of a PCB assembly is determined based on a latent vector.

The latent space may be a one or more dimensional (e.g., two-dimensional, three-dimensional, or n-dimensional) space based on which the quality of the PCB assembly (e.g., of one or more regions of interest including one or more solder joints) may be determined. The latent space may include one or more subspaces that are characteristic for the quality of the PCB assembly. To that end, these subspaces are determined by training the autoencoder. The boundaries of the subspaces may be determined by the autoencoder itself. Each subspace may correspond to a type of fault of the PCB assembly (e.g., a solder bridge or an open solder joint). If a latent vector is in a certain subspace, then the PCB assembly may thus possess a solder bridge or an open solder joint. As a consequence, the latent vector 103 may be used for determining the quality 107 of the PCB assembly.

Figure 5:
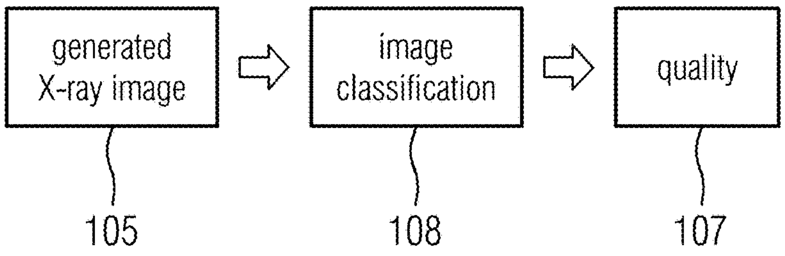
FIG. 5 illustrates a fourth embodiment according to which a quality of a PCB assembly is determined based on a generated X-ray image.

FIG. 5 illustrates a fourth exemplary embodiment according to which a quality of a PCB assembly is determined based on a generated X-ray image. The generated X-ray image may be used in place of the real X-ray image for determining the quality of the PCB assembly. The generated X-ray image may be subject to image classification. For example, an image classification algorithm that determines the quality of the PCB assembly (e.g., by classifying the image into one or more classes that correspond to a quality 107 of the PCB assembly) may be used. For example, the methods as described in the Background section in the above may be used for determining a quality 107 of the PCB assembly.

Figure 6:
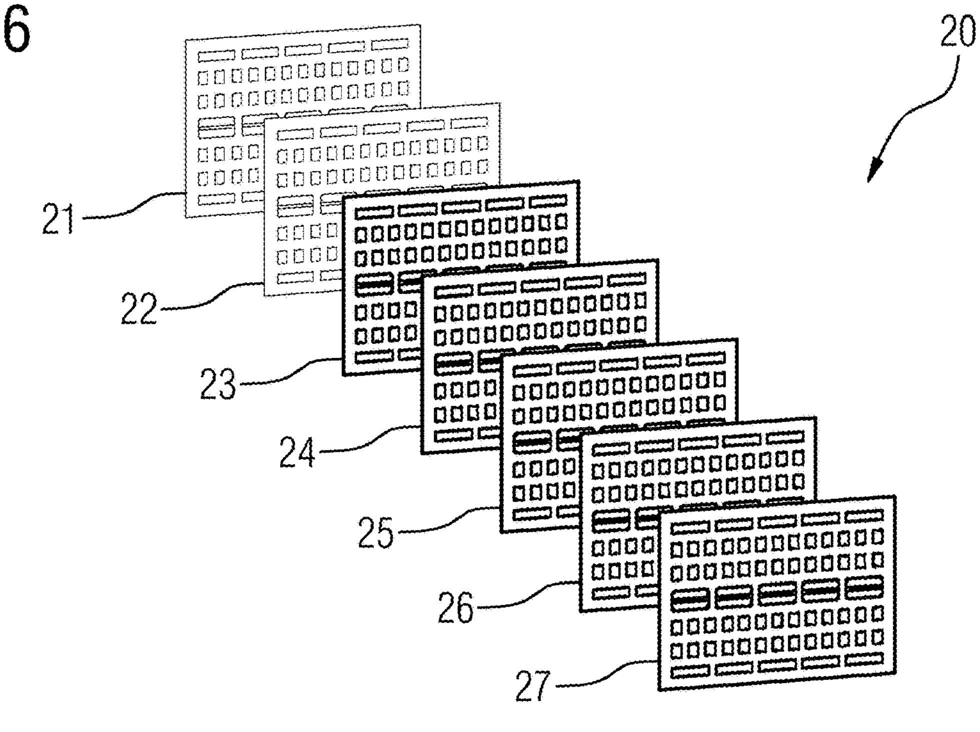
FIG. 6 illustrates an example of a plurality of real x-ray images.

FIG. 6 illustrates a plurality of real X-ray images. As a result of the imaging process by X-raying one or more PCB assemblies, a plurality of X-ray images 20 may be obtained. Herein, each image corresponds to a different PCB assembly produced. The real X-ray images 20 are created by electromagnetic radiation (e.g., X-rays) penetrating the respective PCB assembly. The images 21, 22, 23, 24, 25, 25, 27 may be stored after PCB assemblies are scanned. The X-ray images 20 may be stored, for example, in the form of a file, as a 3D-X-ray matrix or vector. The X-ray images 20 may possess a resolution in height, width, and depth (e.g., of 483×623×65), which may be stored as meta information (e.g., in the form of a separate file). The real X-ray images 20 may thus either be used in full or in part to train an adaptive algorithm.

Figure 7:
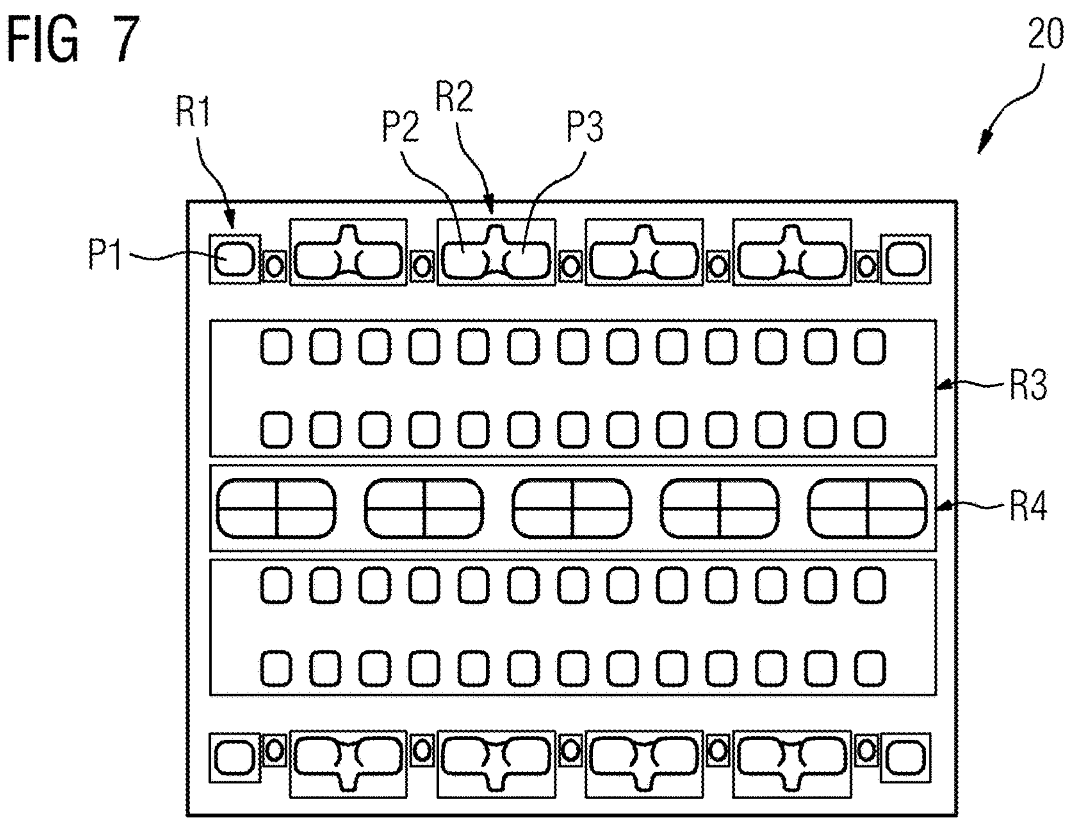
FIG. 7 illustrates an example of a plurality of regions of interest of a PCB assembly.

FIG. 7 illustrates a plurality of regions of interest of a PCB assembly. A region of interest may correspond to an area of the PCB assembly and/or an area of an image of the PCB assembly. A region of interest includes one or more solder joints. Hence, the regions of interest may differ regarding the number of solder joints, the position of solder joints, the size of the solder joints, and the functions of the components attached. As shown in FIG. 7, a first region of interest R1 may include a single but large solder joint P1, whereas a second region of interest R2 includes two solder joints P2, P3. A third region of interest R3 may include a large number of small solder joints, and a fourth region of interest R4 includes a lesser number of rather large solder joints. Thus, respective adaptive algorithms (e.g., trained) may be provided for each region of interest R1, R2, R3, R4, respectively. Accordingly, corresponding regression algorithms may be provided.

FIG. 8 illustrates a PCB assembly L including a plurality of components K1, K22, K3 mounted on a PCB L. A printed circuit board (PCB) mechanically supports and electrically connects electronic components using conductive tracks, pads, and other features etched from one or more sheet layers of copper laminated onto and/or between sheet layers of a non-conductive substrate. Components are generally soldered onto the PCB to both electrically connect and mechanically fasten the components to the PCB. Printed circuit boards are used in nearly all electronic products and in some electrical products, such as passive switch boxes.

A barcode B1 is applied to the PCB L. The barcode B1 contains the component designators, switch settings, test points, and other indications helpful in assembling, testing, servicing, and sometimes using the circuit board. The barcode B1 may be applied, for example, using silk screen printing epoxy ink, liquid photo imaging, or Ink jet printing.

Further, one or more of the components K1, K2 mounted on the PCB may include a data matrix code (DMC) B21, B22 that may also be printed on the one or more components K1, K2. The DMC may include a unique component ID that is read during the assembly process. The production data generated during the assembly may be output in the form of an *.xml file. In addition, the production data may include metadata relating to assembly and logistics data, such as age, of the components.

A component supplier may also provide coplanarity values for the respective components in the form of a *.csv file. By reading the DMC, it is therefore possible to assign the coplanarity values to the corresponding component unambiguously.

Figure 9:
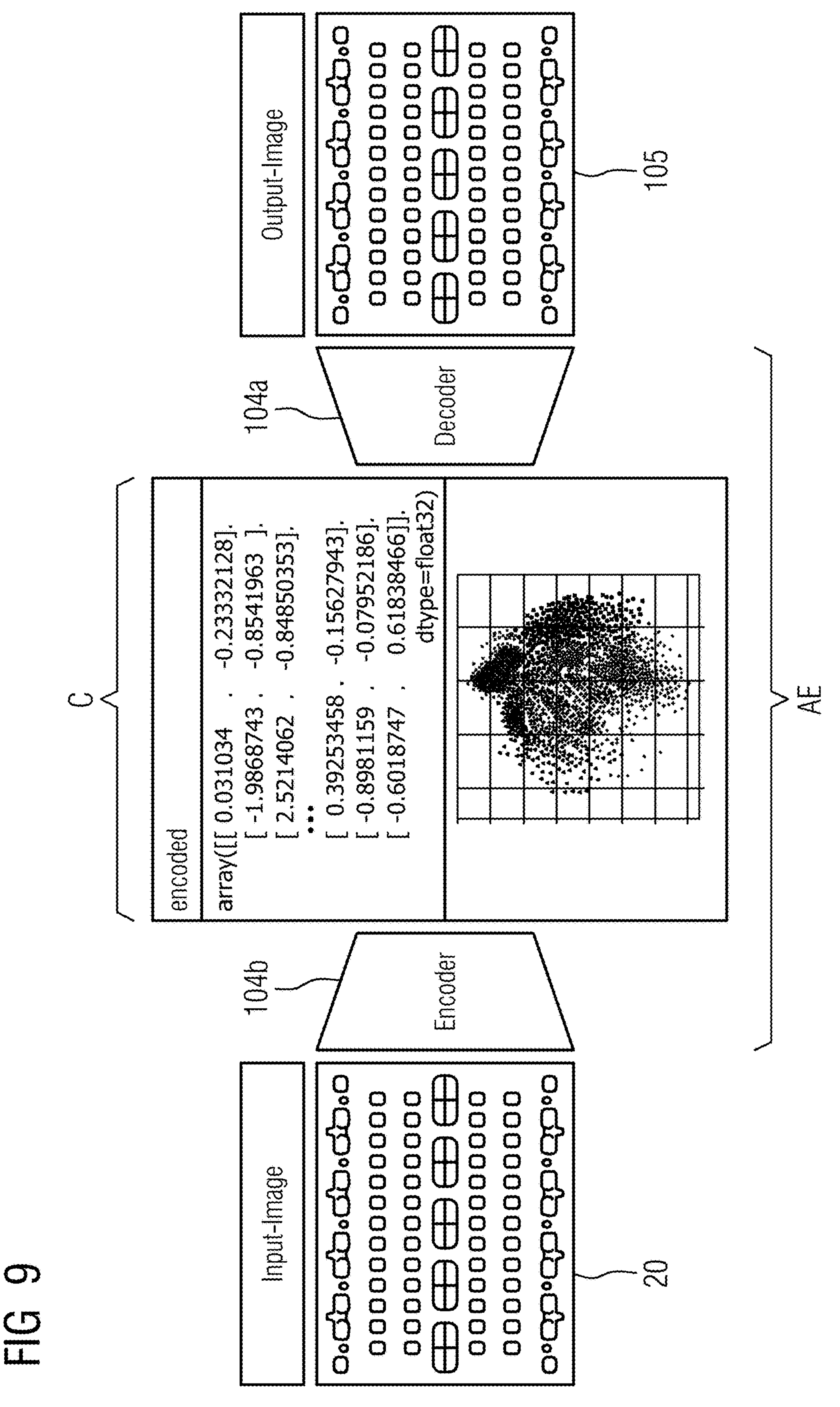
FIG. 9 illustrates an autoencoder for generating X-ray images according to an embodiment.

FIG. 9 illustrates an autoencoder for generating X-ray images according to an embodiment. An autoencoder AE has two main parts: an encoder 104*b* that maps the input into the latent space C; and a decoder 104*a* that maps the latent space C to a reconstruction of the input.

Real world data, such as production data, speech signals, digital images, or MRI scans, may have a great dimensionality. In order to nevertheless deal with such real world data, this data is often to be reduced. By the term dimension reduction in machine learning, the conversion of high-dimensional data in a meaningful representation with reduced dimensionality is understood, so that the low-dimensional representation of the essential characteristics of the original are maintained. Dimension reduction provides a reduced number of new features that are created based on the original data set. The reduced representation may have a dimensionality that corresponds to that of the intrinsic dimensionality of the data. The algorithms of dimension reduction may consist of an encoder-decoder architecture. In the encoder, new features are created from the input data. The decoder performs the opposite process of reconstructing the input data based on the new features. Thus, the dimension reduction may be interpreted as a data compression in which the encoder compresses the data from the outgoing space into an encoded space, also known as latent space or latent representation. The decoder decompresses the data again in the original space. This architecture is used to create a representation from the input data of the original dimensionality. The representation is also referred to as latent representation or latent space. The transfer of the input x into the latent space h is used as encoding, and the return of the codes of latent representation h into the original space is also known as decoding.

In this case, for the purpose of training, real X-ray images are input into an autoencoder AE. The encoder part 104*b* encodes an X-ray image input and creates a latent vector. The decoder 104*a* decodes the latent vector belonging to the image 20 input and thereby generates an output image 105. When multiple X-ray images are input, a latent space C is created. In case a variational autoencoder is used, the latent space is composed by a mixture of distributions instead of fixed vectors. Since the quality of the X-ray images used for training is known, the latent vectors in the latent space and/or a clustering of the latent space may be used to determine the quality of the PCB assembly as well.

The autoencoder may be trained on historic real X-ray images in an unsupervised manner. The X-ray images may contain images of faulty and error-free PCB assemblies. To provide that the autoencoder is able to reconstruct all possible latent vectors in the latent space through the decoder into meaningful images, a regularization may be provided. Then, a regression algorithm maps the production data onto a latent vector in the latent space. Thus, by the regularization, it is provided that from every latent vector regressed by the regression algorithm, also a meaningful faulty image or error-free image of a PCB assembly may be generated by the decoder. Regularization prevents the autoencoder from using a pure mapping function for learned images of the training data set. Due to the great similarity of the images of the individual solder points, the autoencoder is to be able to detect small differences and deviations of individual images. Therefore, the encoder and decoder each have a convolutional neural network with multiple layers. At the same time, the X-ray images are pure grayscale images with a low number of pixels and simple structures, so that there is a high risk of overfittings of the model exists, especially with Deep Convolutional Neural Networks. Overall, therefore, a trade-off is to be achieved between the ability of the autoencoders to detect detailed details of the images, as well as the danger, to achieve overfitting after just a few training periods.

Further, the autoencoder allows a reconstruction of latent vectors into X-ray images. This makes it possible to evaluate the accuracy of the autoencoder, since for a labelled test set of X-ray images, the difference between the original image and the image resulting from the autoencoder may be evaluated (e.g., by the mean squared error). Thereby, a pixel-wise comparison between the real X-ray image input and the generated X-ray image obtained is performed.

In addition, the optical visualization of the generated X-ray image increases the acceptancy of the proposed quality inspection by the users.

Figure 10:
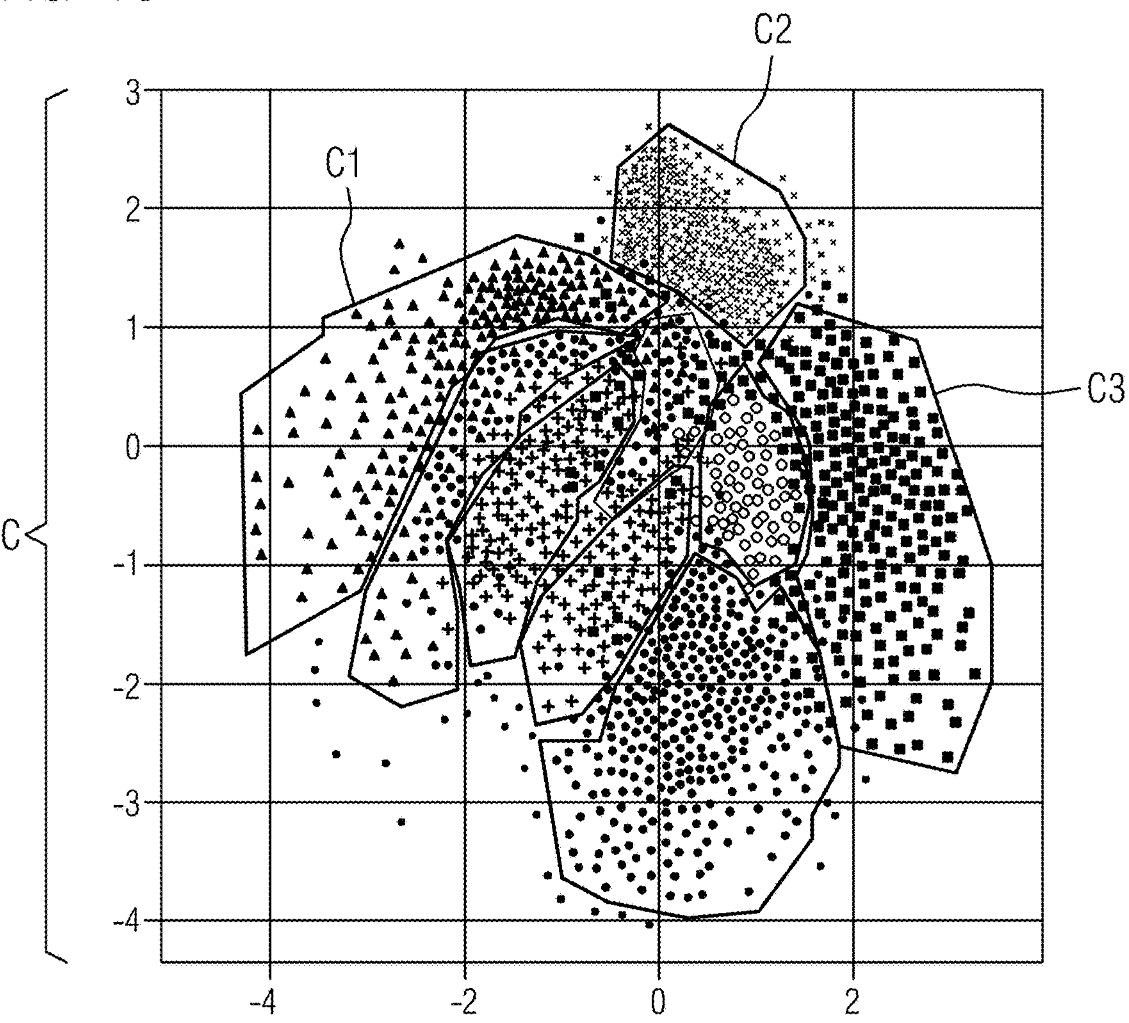
FIG. 10 illustrates an example of a latent space of a trained adaptive algorithm.

FIG. 10 illustrates a latent space of a trained adaptive algorithm. The latent space includes a plurality of clusters C1, C2, C3. The clusters may correspond to one or more features created by the trained adaptive algorithm. The one or more clusters may be created (e.g., by dividing the latent space). This may, for example, be done manually. Alternatively, a clustering algorithm such as K-Means may be used to define the one or more clusters. Each cluster may correspond to a failure type and/or error-free PCB assembly, respectively. Hence, each cluster may be assigned a quality indicator. For example, each cluster may be assigned a quality indicator indicating a failure type. In any case, one or more of the clusters may be assigned a quality indicator corresponding to an error-free PCB assembly.

To achieve an optimized feature extraction and clustering, the autoencoder may be trained with as many training images as possible. The training data set may be balanced (e.g., including faulty and error-free images). Further, sufficient images of different fault categories (e.g., fault types) may be included in the training data set.

Figure 11:
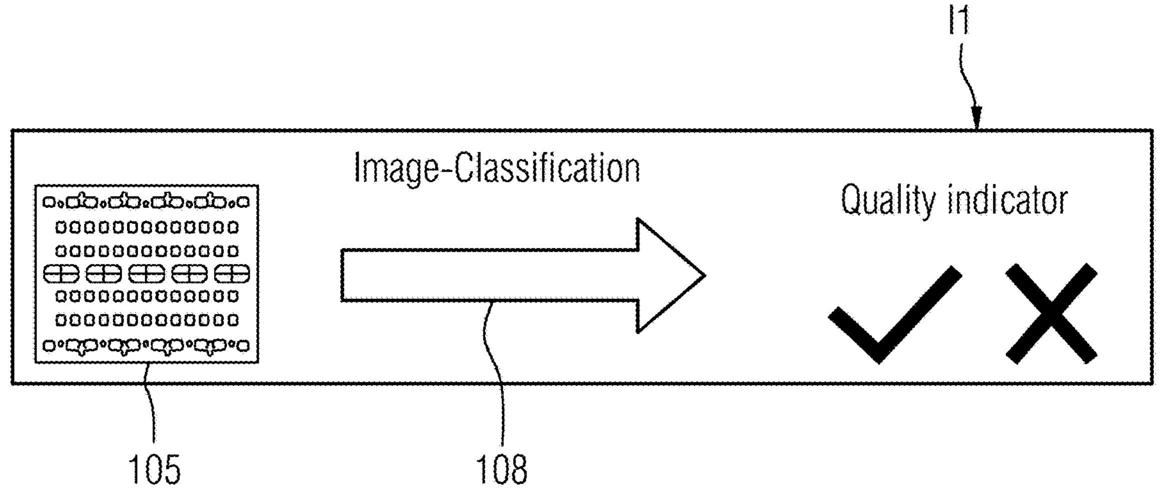
FIG. 11 illustrates an example of the determination of a quality indicator based on an X-ray image.

FIG. 11 illustrates determination of a quality indicator based on an X-ray image. Based on a real X-ray image or an X-ray image generated by the trained adaptive algorithm, a quality indicator may be determined. Image classification may thus be used. As explained earlier, the quality indicator may take either binary values (e.g., "0" or "1") that represent an error-free and faulty PCB assembly, respectively. For each region of interest of the PCB assembly, a quality indicator may be obtained. The image classification may either be rule based or may be based on a trained machine learning model again.

Figure 12:
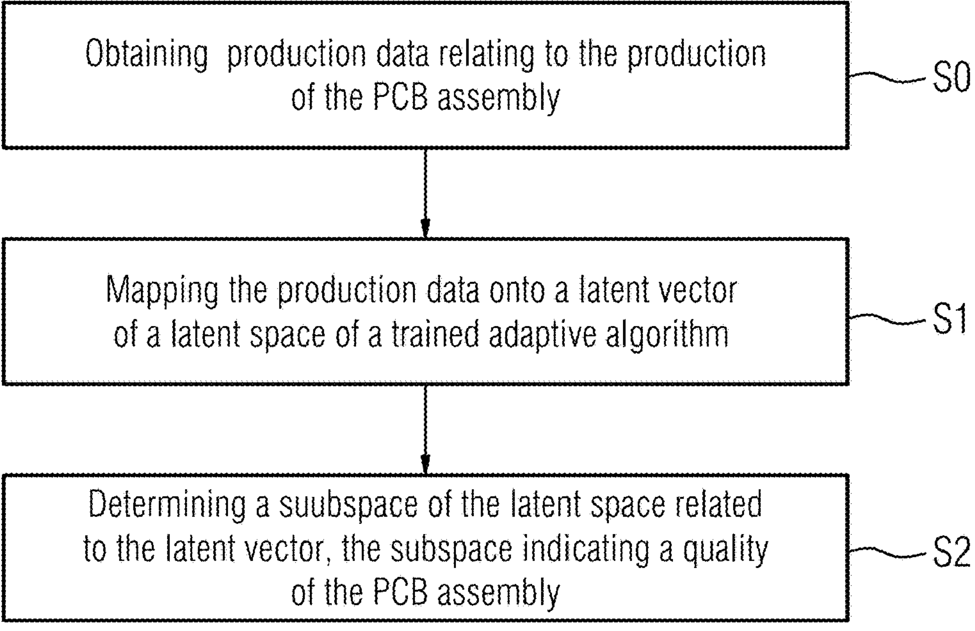
FIG. 12 shows method acts according to an embodiment, where a subspace indicating a quality of a PCB assembly is determined.

FIG. 12 shows method acts according to an embodiment, where a subspace indicating a quality of a PCB assembly is determined. In a first act S0, production data relating to the production of the PCB assembly is obtained. As described in the above, the production data may be obtained based on one or more production acts at one or more production stations. That is after each production act, production data relating to the production act performed is obtained. The production data may be obtained via a shared medium such as a data bus (e.g., wired or wireless) and/or may be stored or in memory. The production data may be related to the production of a PCB assembly. Hence, for each PCB assembly, different or new production data is obtained.

In act S1, the production data may be mapped onto a latent vector of a latent space of a trained adaptive algorithm. A trained regression algorithm may be used. The regression algorithm takes the production data as input and provides a latent vector as an output. The trained regression algorithm may be executed once the production data relating to a certain PCB assembly is received (e.g., at an inspection station at which the regression algorithm is executed).

The latent vector may belong to a latent space. In other words, an adaptive algorithm is trained on real X-ray images of the PCB assembly and/or serves for generating X-ray images, and the latent space of the adaptive algorithm is identified, as will be explained in connection with FIG. 18.

In act S2, a subspace of the latent space related to the latent vector is determined. The subspace indicates a quality of the PCB assembly. As shown, the latent space may include one or more clusters that form subspaces of the latent space. Depending on the values of the latent vector, as obtained by the regression algorithm, the latent vector may belong to a certain subspace. Once the subspace is known, the quality of the PCB assembly may be determined. Hence, the quality of the PCB assembly is predicted without taking a real X-ray image of the PCB assembly or otherwise inspecting the PCB assembly. The different subspaces of the latent space may correspond to aspects of a faulty or error-free PCB assembly. For example, the quality of one or more regions of interest of the PCB assembly may be determined in this way.

Figure 13:
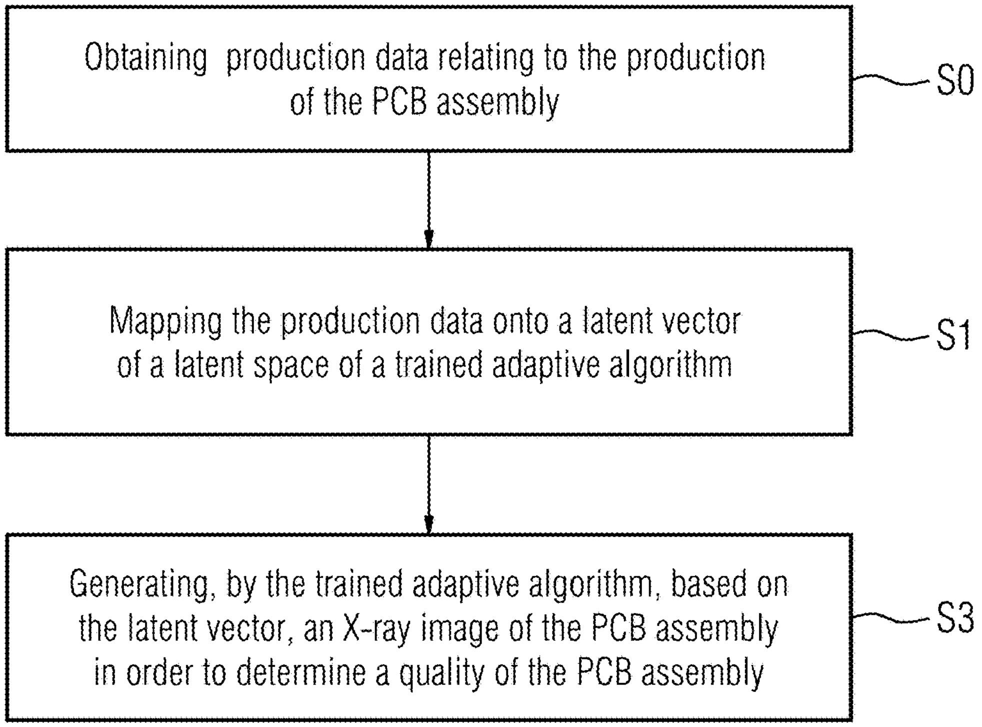
FIG. 13 shows method acts according to another embodiment, where a quality is determined based on a generated X-ray image.

FIG. 13 shows method acts according to another embodiment, where a quality is determined based on a generated X-ray image. As before, in the acts S0 and S1 of FIG. 12, production data is obtained and mapped onto a latent vector. In act S3, an X-ray image of the PCB assembly is generated by the trained adaptive algorithm based on the latent vector in order to determine a quality of the PCB assembly. The generated X-ray image may then be displayed, for example, for manual inspection to a user, and/or may be subject to image processing of an AXI inspection station, only that now the generated image is used instead of taking a real X-ray image.

Figure 14:
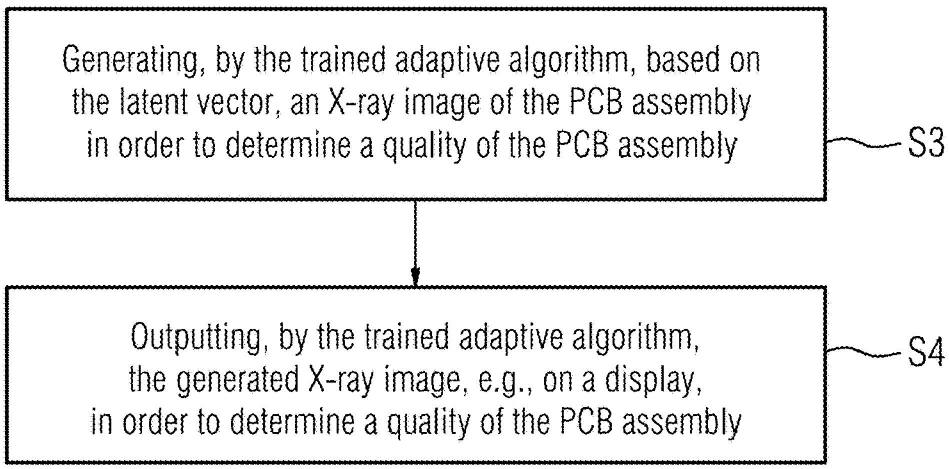
FIG. 14 shows method acts according to yet another embodiment, where a generated X-ray image is output.

FIG. 14 shows method acts according to yet another embodiment, where a generated X-ray image is output. Following the act S3, the generated X-ray image may be output (e.g., on a display) in order to determine a quality of the PCB assembly. The display may be part of an inspection station or may be part of a handheld device. In any case, the generated image is output in order to determine a quality of the PCB assembly. The generated image is then accessible to further processing by one or more other applications that, for example, perform further image processing based on the generated X-ray image.

Figure 15:
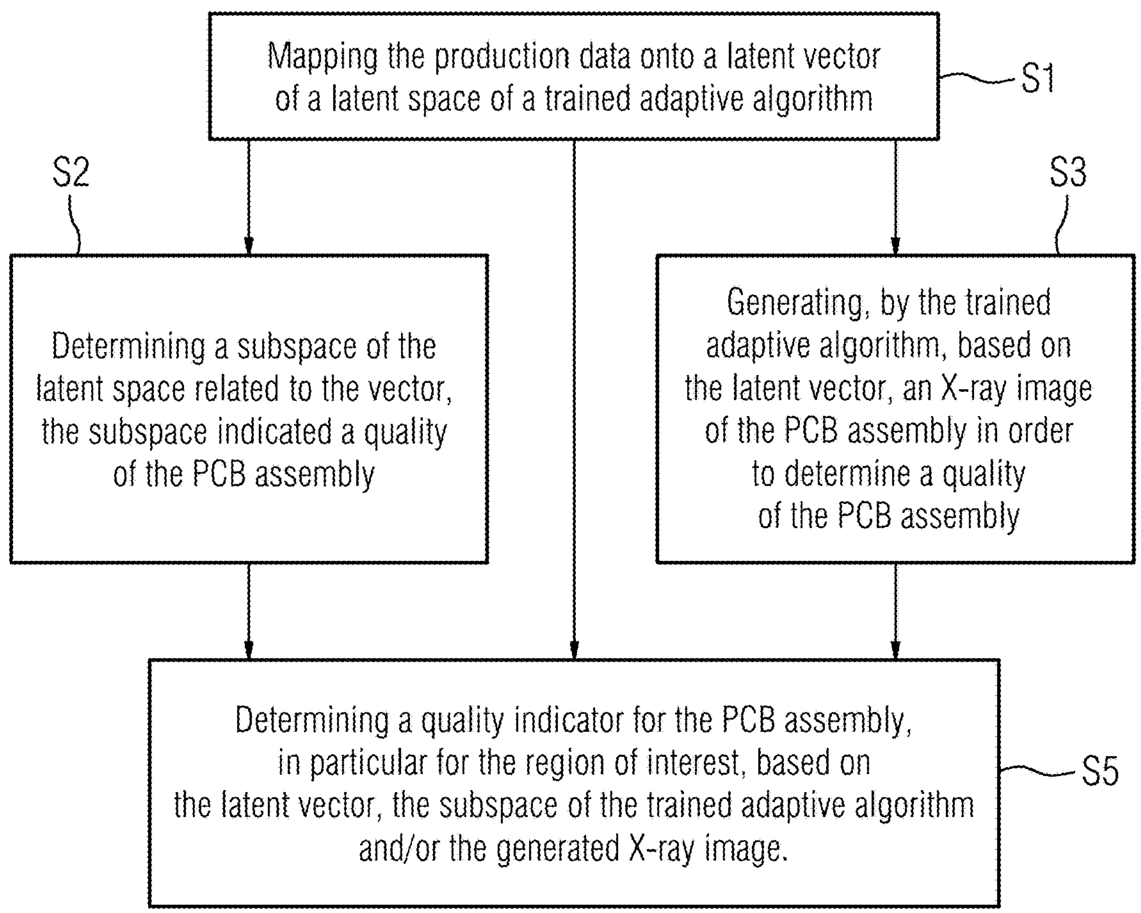
FIG. 15 shows method acts according to yet another embodiment, where a quality indicator for the PCB assembly is determined.

FIG. 15 shows method acts according to yet another embodiment, where a quality indicator for the PCB assembly is determined. The quality of a PCB assembly may be represented by a quality indicator. As mentioned in the above, the quality indicator may be given in a binary form. The quality indicator may also be displayed via a display unit or a separate signaling apparatus (e.g., in the form of a traffic light system). The quality indicator I1 may indicate a faulty or error-free state of the PCB assembly. Additionally, the quality indicator may represent a plurality of error categories. For example, an error indicator may indicate a number of different faulty states (e.g., errors) of a PCB assembly. Possible errors during the production of a printed circuit board assembly are, for example: solder paste is missing or incompletely printed; solder paste smeared; adhesive missing or incompletely printed; adhesive smeared; component missing; component offset or twisted; gravestone effect; component reversed; color detection for MELF components; confusion test for IC/μC types; confusion test for resistance value; component reversed (IC, diode); short circuits and solder bridges (IC, μC); solder joint missing; open THT solder joint; THT solder joint; THT solder joint without contacting; a misalignment of the solder deposit; solder past smearing; and bridge formation. The quality indicator may represent one or more of these error categories and may take different values dependent on the error category. The value of the quality indicator may consist of or include an alpha-numeric string of digits. Further, the quality indicator may describe the error in plain text (see above) or contain the error in coded form.

The quality or quality indicator of the PCB assembly may be determined in act S5 based on one or more of the acts S1, S2 and S3, as described above.

Once the latent vector is obtained (e.g., from the regression algorithm), the quality of the PCB assembly produced may be determined. Optionally, the latent vector may be assigned to a subspace of the latent space, or, even further, an X-ray image may be determined by the adaptive algorithm.

Figure 16:
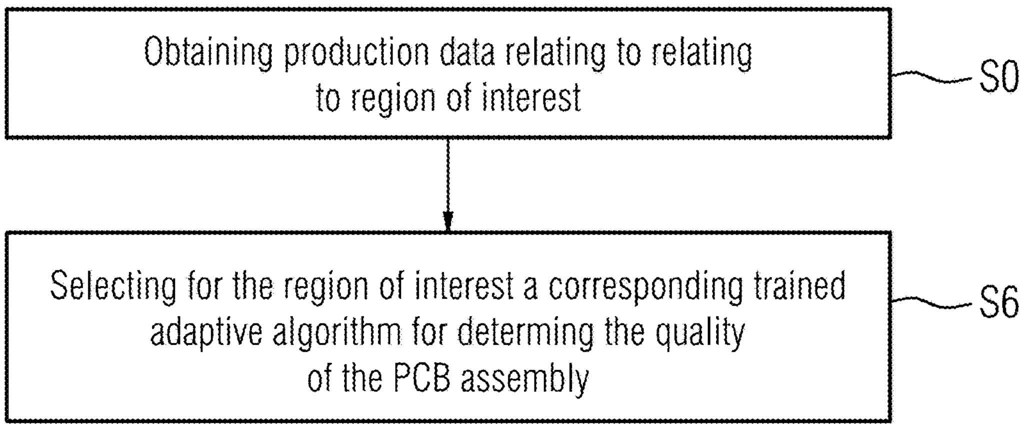
FIG. 16 shows method acts according to yet another embodiment, where a trained adaptive algorithm is selected dependent on a region of interest of a PCB assembly.

FIG. 16 shows method acts according to yet another embodiment, where a trained adaptive algorithm is selected dependent on a region of interest of a PCB assembly. As before, production data is received in act S0. The production data may relate to one or more regions of interest on the PCB assembly. Hence, a first part of the production data may relate to a first region of interest, and a second part of the production data may relate to a second region of interest. The first part of the production data is input into a first regression algorithm for determining a first latent vector for the first region of interest. The second part of the production data is input into a second regression algorithm for determining a second latent vector for the second region of interest. The first latent vector belongs to a first latent space of a first trained adaptive algorithm. The second latent vector belongs to a second latent space of a second trained adaptive algorithm. The first trained adaptive algorithm and the second trained adaptive algorithm are trained on real X-ray images including the first region of interest and the second region of interest, respectively. Accordingly, a plurality of trained adaptive algorithms may be provided. A corresponding trained adaptive algorithm is selected in act S6 for processing the respective latent vector, and as a result, a quality (e.g., indicator) relating to the region of interest is obtained.

Figure 17:
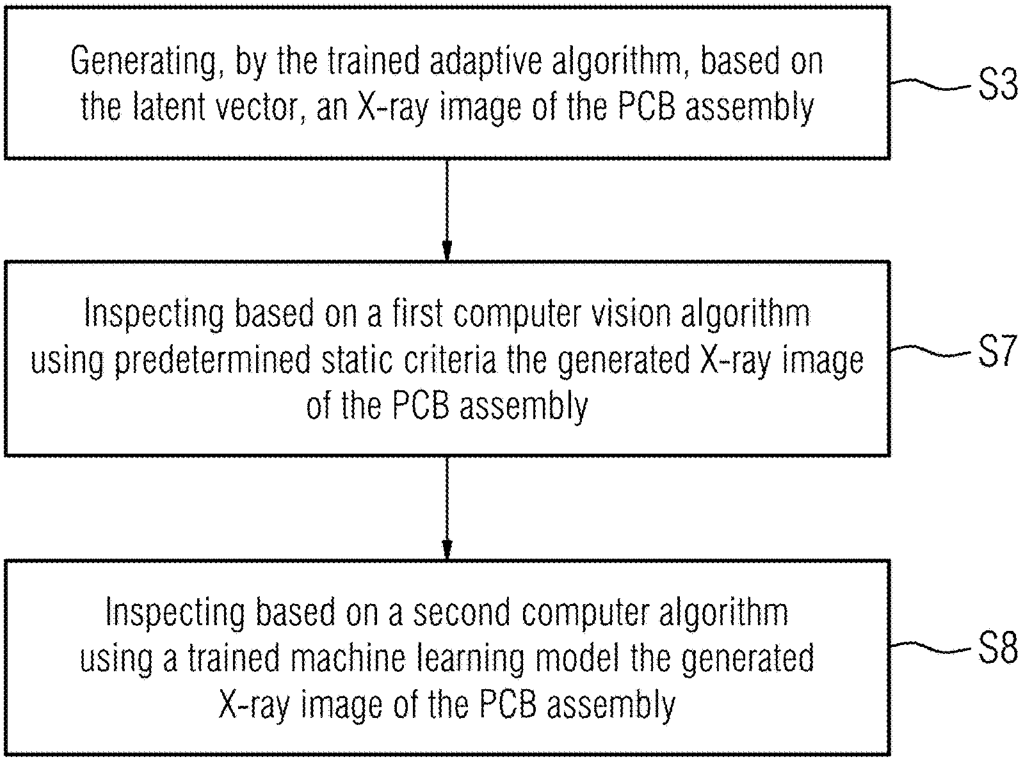
FIG. 17 shows method acts according to yet another embodiment, where inspection of the generated X-ray image is performed based on static, rule-based computer vision and/or a trained machine learning model.

FIG. 17 shows method acts according to yet another embodiment, where inspection of the generated X-ray image is performed based on static, rule-based computer vision and/or a trained machine learning model.

After generating the X-ray image (e.g., according to act S3), the quality of the PCB assembly (e.g., one or more regions of interest) may be determined in act S7 based on a first computer vision algorithm using predetermined static criteria for inspecting the generated X-ray image of the PCB assembly and/or in act S8 on a second computer algorithm using a trained machine learning model for inspecting the generated X-ray image of the PCB assembly. One or more methods for inspecting a PCB assembly and/or an image of a PCB assembly are described in European Patent application with filing number EP 21190840, which is incorporated herein by reference.

The first computer vision algorithm may correspond to the one described in the Background section where a pixel-wise (e.g., pixel-by-pixel) comparison is made to a grayscale threshold. The second computer algorithm may also use a machine learning model that is trained to determine the quality based on the generated X-ray image (e.g., by classifying the generated X-ray image input). The machine learning model may be trained on real X-ray images.

Figure 18:
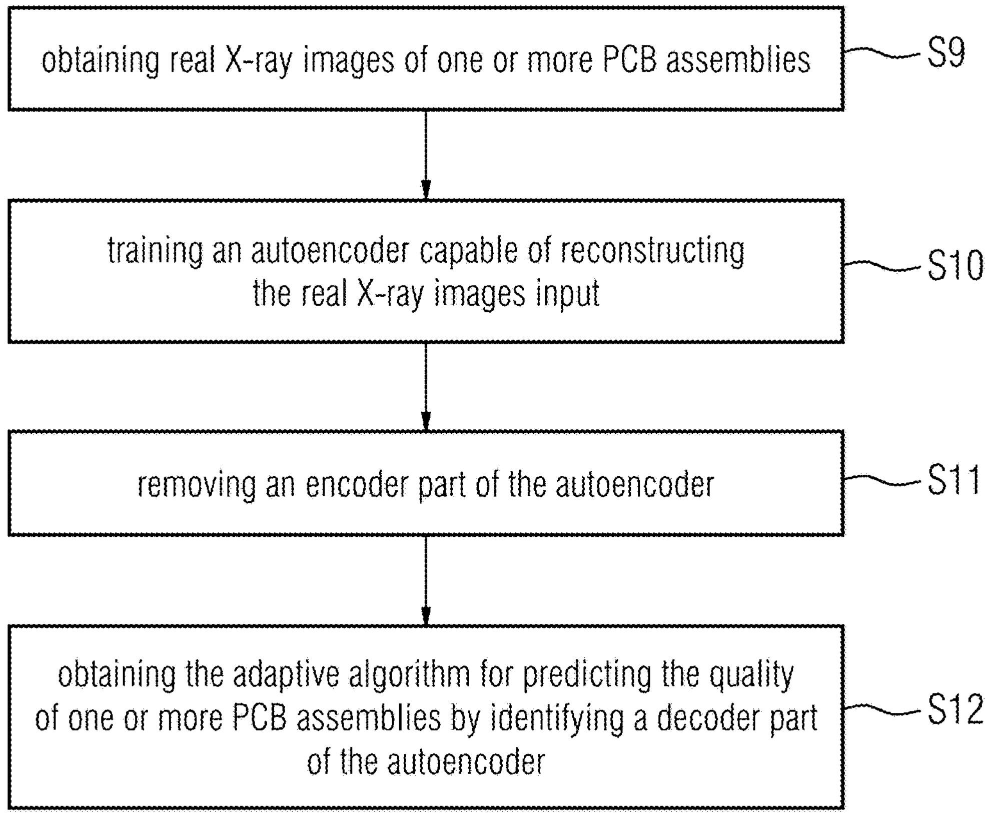
FIG. 18 shows method acts according to yet another embodiment, where a trained adaptive algorithm is obtained.

FIG. 18 shows method acts according to yet another embodiment, where a trained adaptive algorithm is obtained. Therein, real X-ray images of one or more PCB assemblies are obtained in act S9 (e.g., from an X-ray machine at an inspection station). In act S10, an autoencoder capable of reconstructing the real X-ray images is trained. The real X-ray images are input into the input layer of the autoencoder. As a result, the image input is reconstructed by the autoencoder, and the reconstructed image is output via the output layer of the autoencoder. The autoencoder includes an encoder part and a decoder part, as described in the above in connection with FIG. 9. In act S11, the encoder part is removed. In act S12, a trained adaptive algorithm (corresponding to the remaining decoder part) for predicting the quality of the one or more PCB assemblies is obtained. The trained adaptive algorithm that corresponds to the decoder part of the trained autoencoder serves as a latent space interpreter. The trained adaptive algorithm is thus able to receive a latent space vector as input and reconstruct or generate an X-ray image based thereon.

Figure 19:
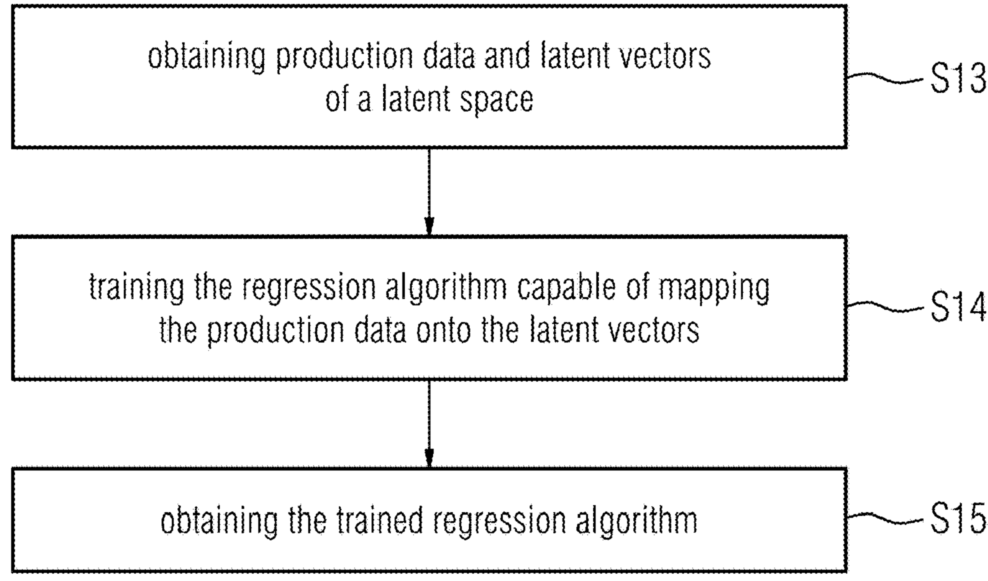
FIG. 19 shows method acts according to yet another embodiment, where a trained regression algorithm is obtained.

FIG. 19 shows method acts according to yet another embodiment, where a trained regression algorithm is obtained. In act S13, production data and latent vectors are obtained. Both of these may be stored in a memory. The production data may be obtained from the one or more production acts for producing the PCB assembly. The latent vectors that relate to the production data may be obtained from the encoder part of the autoencoder as described in connection with FIG. 18. One or more real X-ray images are taken from a PCB assembly to which the production data relates. This real X-ray image is input into the encoder, and a latent space vector is obtained as a result. Hence, production data and one or more latent vectors associated with the production data of a PCB assembly are obtained as just described. This act may be repeated in order to obtain sufficient samples (e.g., production data and associated latent vectors). A regression algorithm may then be trained in act S14. The regression algorithm is capable of mapping the production data onto one or more latent vectors. Thus, the trained regression algorithm is obtained in act S15.

In the case of a regression algorithm, a target variable or label y is determined depending on properties of covariables or features x1, . . . , xn. The target variable is also known as a dependent variable, and the covariables are known as explanatory variables. In the present case, the production data serves as the covariables, and the latent vector that is to be determined serves as the target variable. As a result, the target value y is a random variable that is dependent on the distribution of the explanatory variables. The main objective of regression algorithm is to determine the influence of the explanatory variables on the target variable. In the following, the application of decision trees to regression algorithms is explained. In the case of regression trees, rules are drawn up from the learning data. Through these rules, result spaces are defined (e.g., the rules create a result space). By concatenation of rules, a successive reduction of the result space is obtained until a final assignment is made. Attributes of an input vector are queried at a node and then divided into branching output values for this attribute. Through iteration of this process, the result space for the input vector is reduced by increasing the depth of the regression tree. If a cancellation criterion for a branch is reached, the iteration ends, and the input vector is assigned the class of the final node, which is then termed leaf. During the training phase, the queries of the attributes in the tree are defined in order to obtain the maximum possible information gain for a query. The class assignment of the leaves is determined by the mean value.

Random forests are an ensemble method, whereby decision trees are used as basic regressors. Thereby, the forecast is made by an ensemble of trees by a majority decision. This procedure is also known as bootstrap aggregation or bagging for short. For the generation of the individual decision trees, the training record n of N (for N>n) data points are chosen (with put back) randomly (Bootstrap sample). A corresponding model is trained based on this training data set. This process is repeated t-times, thereby obtaining different regressors from the same training data set. In the subsequent testing, the value of a data point is determined by averaging the totality oft classifiers.

In addition to bagging, a boosting process may also be used to combine multiple regressors. Boosting Tree procedures use a number of simple regressors with only a few branches that have a poor predictive accuracy but only need a short calculation time. These regressors are weighted based on the prediction error during training. This process is repeated until all regressors are weighted in an optimized way. For example, methods known as AdaBoost, Gradient Boosting, Extreme Gradient Boosting (XGBoost), Light GBM, Cat Boost may be used.

FIG. 20 illustrates an apparatus 100 including a processor and a memory. The apparatus may be an inspection station or is part of an inspection station. In order to perform the embodiments and method acts as described in the above, the apparatus includes a memory (e.g., non-transitory), in which program code may be stored. The program code may be executed by the processor. When the program code is executed, the method acts according to any one of the embodiments described in the above may be executed. For example, the apparatus may be equipped with interfaces for receiving the production data. Further, the apparatus may be equipped with an interface in order to output a quality (e.g., indicator) for one or more PCB assemblies produced. The processor and the memory of the apparatus may be operative to store and/or to execute the trained regression algorithm and/or the trained adaptive algorithm. Further, the apparatus may be operative to store and/or to execute, via the memory and the processor, the inspection routines for determining a quality (e.g., indicator) of the PCB assembly based on the generated X-ray image.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of predicting a quality of a printed circuit board (PCB) assembly, the computer-implemented method comprising:

obtaining production data relating to production of the PCB assembly, the production data including solder paste information;

mapping the production data, including the solder paste information, onto a latent vector of a latent space of a trained adaptive algorithm, wherein the trained adaptive algorithm is trained on real X-ray images of PCB assemblies, serves for generating X-ray images of the PCB assemblies, or a combination thereof; and determining a subspace of the latent space related to the latent vector, the subspace indicating a quality of the PCB assembly;

generating, by the trained adaptive algorithm, based on the latent vector, an X-ray image of the PCB assembly, such that a quality of the PCB assembly is determined; or a combination thereof, wherein the solder paste information includes a formation, a size, and a volume of one or more solder depots applied to the PCB assembly, wherein the PCB assembly comprises a plurality of regions of interest, each region of interest of the plurality of regions of interest comprising one or more soldering points, the respective region of interest corresponding to an area of the PCB assembly, an area of an image of the PCB assembly, or the area of the PCB assembly and the area of the image of the PCB assembly, the production data relating to the respective region of interest, wherein the computer-implemented method further comprises selecting, for each region of interest of the plurality of regions of interest, a corresponding trained adaptive algorithm for determining the quality of the PCB assembly, and wherein the plurality of regions of interest differ regarding a number of the one or more soldering points, positions of the one or more soldering points, sizes of the one or more soldering points, or any combination thereof.

2. The computer-implemented method of claim 1, wherein the mapping comprises mapping based on a trained regression algorithm.

3. The computer-implemented method of claim 1, wherein the subspace indicates a quality of a region of interest of the PCB assembly.

4. The method of claim 1, further comprising outputting, by the trained adaptive algorithm, the generated X-ray image, such that a quality of the PCB assembly is determined.

5. The method of claim 1, further comprising determining a quality indicator for the PCB assembly based on the latent vector, the subspace of the trained adaptive algorithm, the generated X-ray image, or any combination thereof.

6. The method of claim 1, wherein the production data comprises:

component information;

information of one or more properties of the PCB;

a residual oxygen level, a temperature profile of a reflow oven, a degree of aging, or any combination thereof of the PCB, components mounted on the PCB, or a combination thereof; or any combination thereof.

7. The method of claim 6, wherein:

the solder paste information includes formation, size, volume, or any combination thereof of one or more solder depots applied to the PCB;

the component information includes co-planarity information of pins of a component;

the component information includes a material of a substrate of the PCB, a solder resist application process type, a production site, or any combination thereof; or any combination thereof.

8. The method of claim 1, further comprising:

inspecting the generated X-ray image of the PCB assembly based on a first computer vision algorithm using predetermined static criteria;

inspecting the generated X-ray image of the PCB assembly based on a second computer algorithm using a trained machine learning model; or a combination thereof.

9. An apparatus comprising:

a processor; and a memory, wherein the processor is configured to:

obtain production data relating to production of a PCB assembly, the production data including solder paste information;

map the production data, including the solder paste information, onto a latent vector of a latent space of a trained adaptive algorithm, wherein the trained adaptive algorithm is trained on real X-ray images of PCB assemblies, serves for generating X-ray images of the PCB assemblies, or a combination thereof, and determine a subspace of the latent space related to the latent vector, the subspace indicating a quality of the PCB assembly;

generate, by the trained adaptive algorithm, based on the latent vector, an X-ray image of the PCB assembly, such that a quality of the PCB assembly is determined; or a combination thereof, wherein the solder paste information includes a formation, a size, and a volume of one or more solder depots applied to the PCB assembly, wherein the PCB assembly comprises a plurality of regions of interest, each region of interest of the plurality of regions of interest comprising one or more soldering points, the respective region of interest corresponding to an area of the PCB assembly, an area of an image of the PCB assembly, or the area of the PCB assembly and the area of the image of the PCB assembly, the production data relating to the respective region of interest, and wherein the processor is further configured to select, for each region of interest of the plurality of regions of interest, a corresponding trained adaptive algorithm for determining the quality of the PCB assembly, and wherein the plurality of regions of interest differ regarding a number of the one or more soldering points, positions of the one or more soldering points, sizes of the one or more soldering points, or any combination thereof.

10. The apparatus of claim 9, wherein the apparatus is an inspection station.

11. A computer-implemented method of obtaining an adaptive algorithm for predicting a quality of one or more printed circuit board (PCB) assemblies, the computer-implemented method comprising:

obtaining real X-ray images of one or more PCB assemblies;

training an autoencoder capable of reconstructing the real X-ray images input;

obtaining the adaptive algorithm for predicting the quality of the one or more PCB assemblies, the obtaining of the adaptive algorithm comprising identifying a decoder part of the autoencoder, wherein the decoder part serves as a latent space interpreter, wherein the adaptive algorithm is configured to receive a latent space vector as input and reconstruct or generate an X-ray image based on the received latent space vector as output, the latent space vector being based on production data, wherein the production data includes solder paste information, the solder paste information including a formation, a size, and a volume of one or more solder depots applied to the one or more PCB assemblies, wherein a PCB assembly of the one or more PCB assemblies comprises a plurality of regions of interest, each region of interest of the plurality of regions of interest comprising one or more soldering points, the respective region of interest corresponding to an area of the PCB assembly, an area of an image of the PCB assembly, or the area of the PCB assembly and the area of the image of the PCB assembly, the production data relating to the respective region of interest, wherein the computer-implemented method further comprises selecting, for each region of interest of the plurality of regions of interest, a corresponding trained adaptive algorithm for determining the quality of the PCB assembly, and wherein the plurality of regions of interest differ regarding a number of the one or more soldering points, positions of the one or more soldering points, sizes of the one or more soldering points, or any combination thereof.

12. The computer-implemented method of claim 11, wherein obtaining the real X-ray images of one or more PCB assemblies comprises obtaining the real X-ray images of one or more PCB assemblies from an X-ray inspection system.

13. The computer-implemented method of claim 11, wherein identifying the decoder part of the autoencoder comprises removing an encoder part of the autoencoder.

14. The method of claim 6, wherein the production data comprises the residual oxygen level, the temperature profile of the reflow oven, and the degree of aging.

15. The computer-implemented method of claim 1, wherein a first of the regions of interest and a second of the regions of interest differ regarding function of components attached to the PCB assembly within the first region of interest and the second region of interest, respectively.

* * * * *